US009380489B2

(12) United States Patent
Kotecha et al.

(10) Patent No.: US 9,380,489 B2
(45) Date of Patent: Jun. 28, 2016

(54) DYNAMIC NETWORK TRAFFIC ANALYSIS AND TRAFFIC FLOW CONFIGURATION FOR RADIO NETWORKS

(71) Applicant: Verizon Patent and Licensing Inc., Basking Ridge, NJ (US)

(72) Inventors: Lalit R. Kotecha, San Ramon, CA (US); Rakesh Chandwani, Freehold, NJ (US); Matthew W. Nelson, Pleasanton, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 319 days.

(21) Appl. No.: 13/945,471

(22) Filed: Jul. 18, 2013

(65) Prior Publication Data

US 2015/0023168 A1    Jan. 22, 2015

(51) Int. Cl.
*H04W 28/02* (2009.01)
*H04L 12/801* (2013.01)
*H04L 12/851* (2013.01)
*H04L 12/26* (2006.01)

(52) U.S. Cl.
CPC ............ *H04W 28/0289* (2013.01); *H04L 47/11* (2013.01); *H04L 47/2441* (2013.01); *H04L 43/0876* (2013.01)

(58) Field of Classification Search
CPC ........... H04W 28/02–28/0294; H04L 47/2441; H04L 47/225; H04L 47/2483; H04L 47/10–47/41

USPC .................................. 370/252, 229–240, 253
See application file for complete search history.

(56) References Cited

U.S. PATENT DOCUMENTS

| 5,737,313 | A  | * | 4/1998  | Kolarov et al. ............... 370/234 |
| 5,903,547 | A  | * | 5/1999  | Shimokasa .................... 370/232 |
| 2007/0127378 | A1 | * | 6/2007  | Yang et al. ..................... 370/235 |
| 2007/0177501 | A1 | * | 8/2007  | Papasakellariou ............ 370/229 |
| 2011/0299395 | A1 | * | 12/2011 | Mariblanca Nieves ....... 370/235 |
| 2012/0052866 | A1 | * | 3/2012  | Froehlich ................ H04L 47/14 455/445 |
| 2012/0257499 | A1 | * | 10/2012 | Chatterjee ......... H04W 28/0284 370/232 |
| 2013/0010598 | A1 | * | 1/2013  | Ludwig .................. H04L 47/10 370/235 |
| 2013/0064080 | A1 | * | 3/2013  | Kemmerer ............ H04L 47/781 370/230 |

* cited by examiner

*Primary Examiner* — Mark Rinehart
*Assistant Examiner* — Kenneth P Hunt

(57) ABSTRACT

A system may receive, from a base station, information indicating that a network congestion level associated with the base station satisfies a threshold, the network congestion level being a measurement of traffic associated with a network, and the network including the base station. The system may determine, based on the network congestion level satisfying the threshold, traffic flow information for a plurality of traffic flows associated with the base station. The system may identify a congestion-causing traffic flow, of the plurality of traffic flows, based on the traffic flow information. The system may provide information identifying the congestion-causing traffic flow.

20 Claims, 12 Drawing Sheets

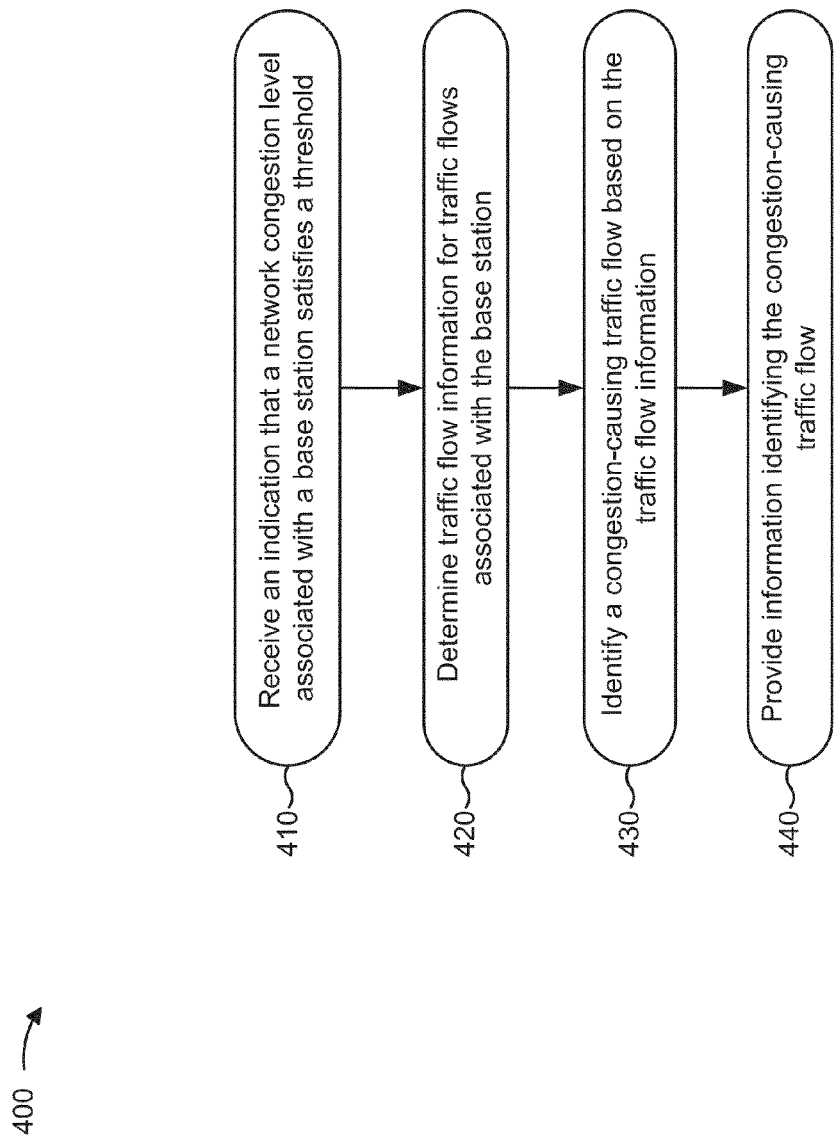

DYNAMIC NETWORK TRAFFIC ANALYSIS AND TRAFFIC FLOW CONFIGURATION FOR RADIO NETWORKS

BACKGROUND

Wireless networks may experience congestion as a result of network resource usage by user devices. Network congestion may result in poor user experience, slow data transfer, dropped calls, etc. Network devices may be configured to alleviate congestion.

BRIEF DESCRIPTION OF THE DRAWINGS

FIG. 4 is a flow chart of an example process for dynamic network traffic analysis;

DETAILED DESCRIPTION

The following detailed description of example implementations refers to the accompanying drawings. The same reference numbers in different drawings may identify the same or similar elements.

A radio access network may utilize a finite resource, such as a bandwidth, a quantity of bearer channels, or the like, and may include configurable parameters, such as a quality of service ("QoS") priority, a bandwidth allocation, a traffic throughput rate, or the like. During periods of network congestion, a network device may adjust the configurable parameters to alleviate congestion associated with the finite resource. A network provider may monitor traffic across the network and determine adjustments to configurable parameters associated with all users in the network. However, continuously monitoring traffic (e.g., monitoring traffic all the time) across the entire network may be expensive, may be complex, may require excessive data processing, and may not be scalable. Implementations described herein may assist a radio access network provider in alleviating congestion by providing dynamic traffic analysis and selective monitoring to facilitate traffic flow configuration based on localized congestion conditions.

Figure 1A:
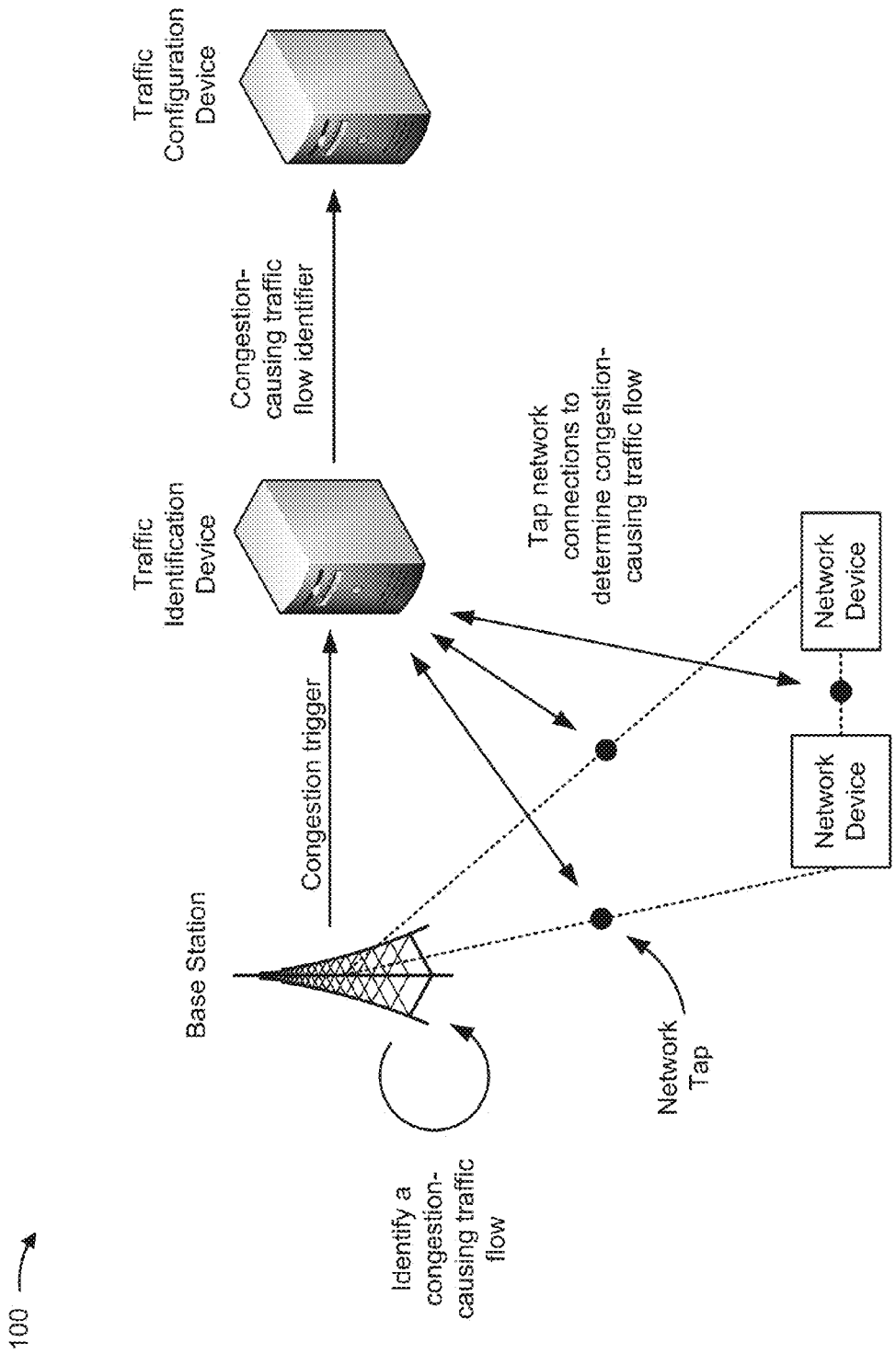
FIGS. 1A and 1B are diagrams of an overview of an example implementation described herein.
Figure 1B:
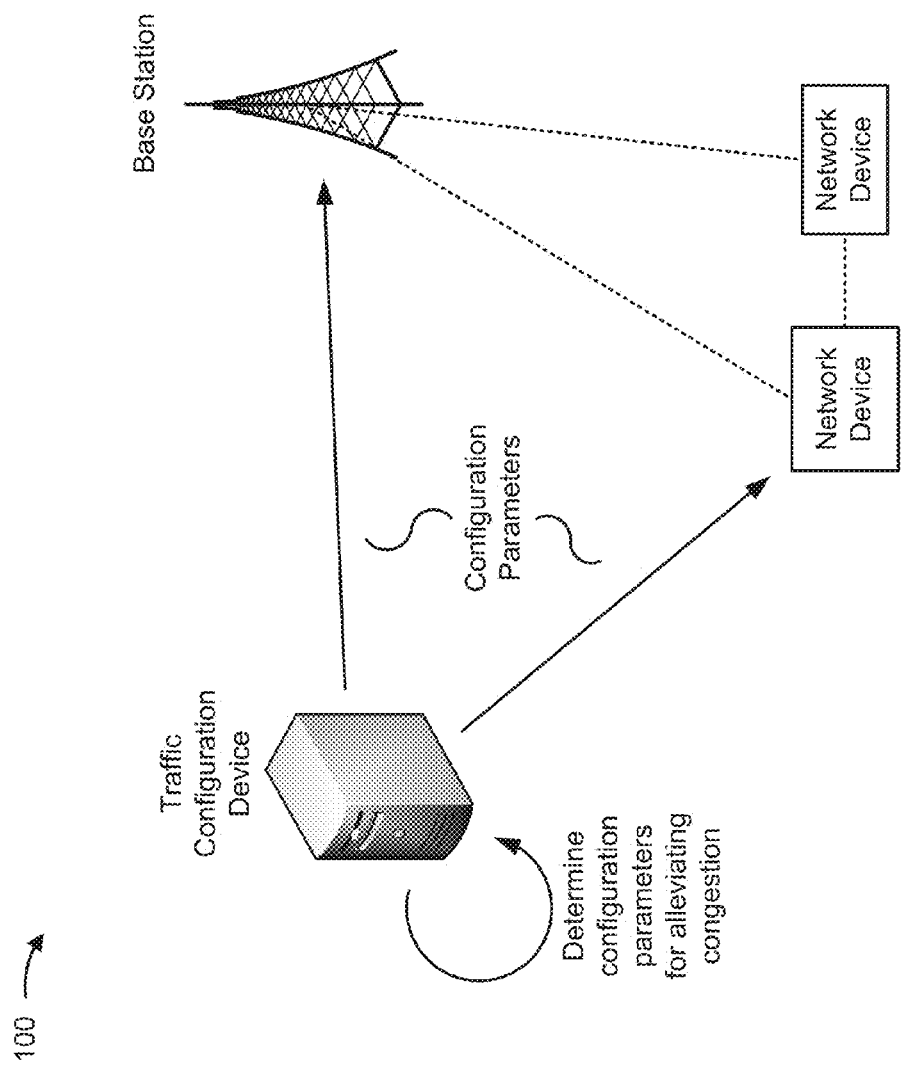

FIGS. 1A and 1B are diagrams of an overview of an example implementation 100 described herein. Example implementation 100 may include a base station, multiple network devices (e.g., a mobility management entity ("MME"), a serving gateway ("SGW"), a packet data network gateway ("PGW"), etc.), a traffic identification device, multiple network taps, and a traffic configuration device.

As shown in FIG. 1A, the base station may be in communication with the traffic identification device and a local network. The local network may include the base station and the multiple network devices. The traffic identification device may receive network congestion information from the base station, indicating that a network congestion level associated with the base station (e.g., the network congestion level of a segment of the local network) satisfies a threshold. For example, the traffic identification device may receive information identifying a measurable network resource, such as a resource block utilization, a packet latency, a packet jitter, a packet loss rate, a packet delay, a cell throughput, or the like, that satisfies a threshold. The traffic identification device may capture traffic flow information via the multiple network taps. For example, the traffic identification device may determine traffic flow information associated with one or more traffic flows over the local network (e.g., one or more connections between the base station and a network device, the network device and another network device, etc.). The traffic identification device may determine a congestion-causing traffic flow based on the traffic flow information, and may provide information identifying the congestion-causing traffic flow to the traffic configuration device.

As shown in FIG. 1B, the traffic configuration device may receive the information identifying the congestion-causing traffic flow. The traffic configuration device may determine one or more configuration parameters associated with reducing the network congestion level associated with the base station based on the congestion-causing traffic flow, a user device associated with the congestion-causing traffic flow, and traffic flow information. For example, the traffic configuration device may determine a network device configuration parameter (e.g., a QoS adjustment, a queue length adjustment, a traffic routing algorithm adjustment, etc.) and/or a traffic configuration parameter (e.g., a transmission control protocol ("TCP") adjustment, a video transrate adjustment, a video transcode adjustment, etc.). The traffic configuration device may provide the configuration parameters, may cause a configuration adjustment based on the provided configuration parameters, and may reduce the network congestion associated with the base station. For example, the traffic configuration device may provide a first configuration parameter to the base station, and may provide a second configuration parameter to one or more of the network devices. In this way, a traffic identification device may identify congestion-causing traffic flows using dynamic traffic analysis, and a traffic configuration device may determine configuration adjustments to alleviate a congestion condition associated with a whole or a part of a network.

Figure 2:
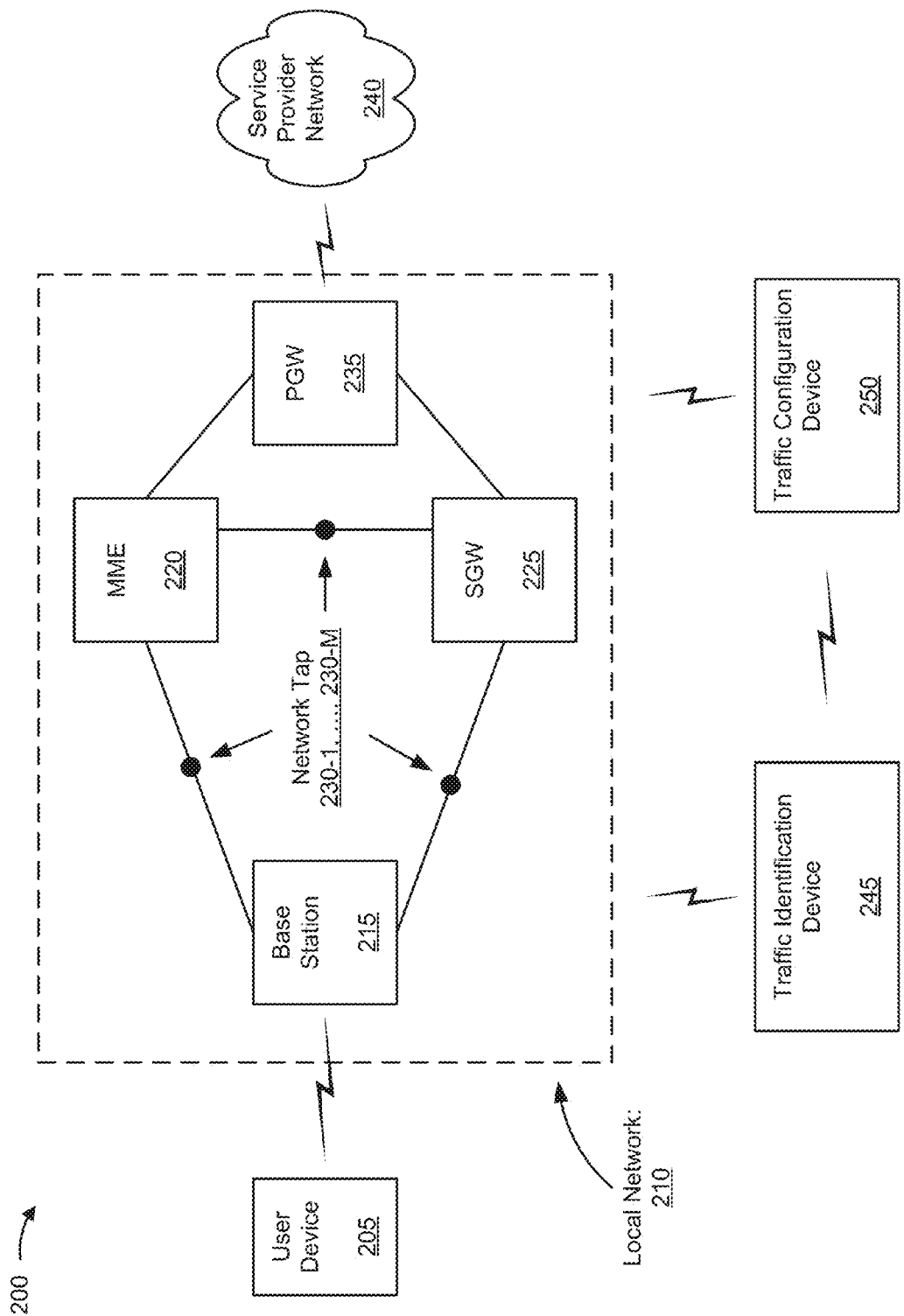
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 205, a local network 210, a base station 215, an MME 220, an SGW 225, one or more network taps 230-1 through 230-M (M≥1) (hereinafter referred to collectively as "network taps 230" and individually as "network tap 230"), a PGW 235, a service provider network 240, a traffic identification device 245, and a traffic configuration device 250. Devices of environment 200 may interconnect via wired connections, wireless connections, or a combination of wired and wireless connections.

User device 205 may include one or more devices capable connecting to local network 210 via base station 215. For example, user device 205 may include a mobile phone (e.g., a smart phone), a radiotelephone, a personal communications system ("PCS") terminal (e.g., that may combine a cellular radiotelephone with data processing and data communications capabilities), a personal digital assistant ("PDA") (e.g., that may include a radiotelephone, a pager, Internet/intranet access, etc.), a computer (e.g., a desktop computer, a laptop computer, a tablet computer, etc.), a personal gaming system, and/or another similar type of device. User device 205 may send traffic to and/or receive traffic from service provider network 240 (e.g., via base station 215, SGW 225, and/or PGW 235).

Local network 210 may include one or more wired and/or wireless networks that include one or more network devices, such as base station 215, MME 220, SGW 225, and/or PGW 235. In some implementations, local network 210 may include one or more connections between base station 215, MME 220, SGW 225, and/or PGW 235. In some implementations, local network 210 may transfer network traffic to and/or from service provider network 240 (e.g., via PGW 235). Additionally, or alternatively, local network 210 may transfer network traffic to and/or from user device 205 (e.g., via base station 215).

Base station 215 may include one or more devices capable of receiving, generating, processing, storing, and/or transmitting network traffic, such as media, audio, video, text, and/or other traffic, received from and/or destined for user device 205. In some implementations, base station 215 may include an eNodeB ("eNB") associated with a long term evolution ("LTE") network that receives traffic from and/or sends traffic to service provider network 240 via PGW 235 and/or SGW 225 (e.g., via local network 210). Additionally, or alternatively, one or more base stations 215 may be associated with a radio access network ("RAN") that is not associated with an LTE network. In some implementations, base station 215 may receive traffic from and/or transmit traffic to user device 205 via an air interface. Base station 215 may determine a network congestion level associated with the traffic being routed from service provider network 240 to user device 205 via local network 210. In some implementations, base station 215 may receive a network device configuration parameter (e.g., from traffic configuration device 250) identifying a configuration adjustment for reducing the network congestion level associated with local network 210.

MME 220 may include one or more network devices capable of acting as a control node for a network (e.g., local network 210) associated with base station 215. For example, MME 220 may initiate paging and authentication of user device 205, may determine location information associated with user device 205, may determine a priority class and/or a subscriber class associated with user device 205 (e.g., via a home subscriber server ("HSS")), may select a gateway for user device 205, or the like. MME 220 may perform an operation associated with handing off user device 205 from a first base station 215 to a second base station 215 when user device 205 is transitioning from a cell associated with the first base station 215 to a cell associated with the second base station 215. Additionally, or alternatively, MME 220 may select another MME (not shown), to which user device 205 should be handed off (e.g., when user device 205 moves out of range of MME 220). In some implementations, MME 220 may be associated with an LTE network, and may communicate with base station 215, SGW 225, and/or PGW 235. For example, MME 220 may include protocols enabling communication to base station 215 via an S1-MME interface connection and to SGW 225 via an S11 interface connection.

SGW 225 may include one or more network devices capable of facilitating a transfer of packets across local network 210 to user device 205. For example, SGW 225 may be associated with an LTE network, and may communicate with base station 215, MME 220, and/or PGW 235. In some implementations, SGW 225 may include protocols enabling communication to base station 215 via an S1-U interface connection and to MME 220 via an S11 interface connection. SGW 225 may include one or more data processing and/or traffic transfer devices, such as a gateway, a router, a modem, a switch, a firewall, a network interface card ("NIC"), a hub, a bridge, a proxy server, an optical add/drop multiplexer ("OADM"), or any other type of device that processes and/or transfers traffic. In some implementations, SGW 225 may aggregate traffic received from one or more base stations 215 associated with local network 210, and may send the aggregated traffic to service provider network 240 (e.g., via SGW 225). SGW 225 may also receive traffic from service provider network 240 and/or other network devices (e.g., via local network 210), and may send the received traffic to user device 205 via base station 215. Additionally, or alternatively, SGW 225 may perform operations associated with handing off user device 205 to and/or from an LTE network associated with base station 215.

Network tap 230 may include one or more devices capable of receiving, generating, capturing, processing, storing, and/or transmitting information associated with data flowing across local network 210, such as packet information. For example, network tap 230 may include a packet analyzer device, a packet sniffer device, a network analyzer device, a virtual network tap, and/or another similar type of device. Capturing a packet, as used herein, may include capturing a packet, capturing a copy of a packet, capturing information associated with a packet, or the like. For example, network tap 230 may detect a packet traveling along a traffic flow of local network 210, and may create a copy of the packet to determine packet information associated with the packet. A packet, as used herein, may refer to a packet, a datagram, a cell, a fragment of a packet, a fragment of a datagram, a fragment of a cell, or any other type or arrangement of data that may be carried at a specified communication layer. In some implementations, network tap 230 may determine traffic flow information associated with one or more traffic flows.

PGW 235 may include one or more network devices capable of providing access between local network 210 and service provider network 240. For example, PGW 240 may establish a network address for user device 205 and may route packets to and/or from user device 205 (e.g., via SGW 220 and base station 215). PGW 235 may include one or more data processing and/or data transfer devices, such as a gateway, a router, a modem, a switch, a firewall, a NIC, a hub, a bridge, a proxy server, an OADM, or another type of device that processes and/or transfers traffic. In some implementations, PGW 235 may aggregate traffic received from one or more SGWs 225, and may send the aggregated traffic to service provider network 240. Additionally, or alternatively, PGW 235 may receive traffic from service provider network 250, and may send the traffic to user device 205 via SGW 225.

Service provider network 240 may include one or more wired and/or wireless networks. For example, service provider network 240 may include a cellular network (e.g., a CDMA network, an LTE network, etc.), a Wi-Fi network, a local area network ("LAN"), a wide area network ("WAN"), a metropolitan area network ("MAN"), an intranet, the Internet, a fiber optic-based network, or a combination of these or other types of networks. In some implementations, service provider network 240 may include one or more devices capable or receiving traffic configuration parameters and shaping network traffic transferred from service provider network 240 to alleviate congestion associated with local network 210. For example, when providing video traffic, service provider network 240 may include devices capable of adjusting a video transrate, a video encoding, or the like.

Traffic identification device 245 may include one or more devices capable of receiving, generating, processing, storing, and/or providing information associated with network traffic, such as information associated with a traffic flow, information associated with network congestion, or the like. For example, traffic identification device 245 may include a server, a router, a hub, a gateway, a node, or the like. In some implementations, traffic identification device 245 may identify a congestion-causing traffic flow, and may provide information identifying the congestion-causing traffic flow to traffic configuration device 250. In some implementations, traffic identification device 245 may capture information associated with identifying the congestion-causing traffic flow (e.g., packet information) via network taps 230.

Traffic configuration device 250 may include one or more devices capable of receiving, generating, processing, storing, and/or transmitting information associated with network traffic, such as traffic flow information, user device identification information, configuration parameters, or the like. For example, traffic configuration device 250 may include a server, a router, a hub, a gateway, a node, or the like. In some implementations, traffic configuration device 250 may determine a user device 205 associated with a congestion-causing traffic flow, and may determine one or more configuration parameters based on the congestion-causing traffic flow and user device 205 to alleviate network congestion.

An implementation is described herein as being performed within a long term evolution ("LTE") network for explanatory purposes. Some implementations may be performed within a network that is not an LTE network, such as a third generation ("3G") network or another type of radio access network.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. For example, while traffic identification device 245 and traffic configuration device 250 are shown as separate devices, traffic identification device 245 and traffic configuration device 250 may be implemented in a single device or a single collection of devices. Additionally, one or more of the devices of environment 200 may perform one or more functions described as being performed by another one or more devices of environment 200.

Figure 3:
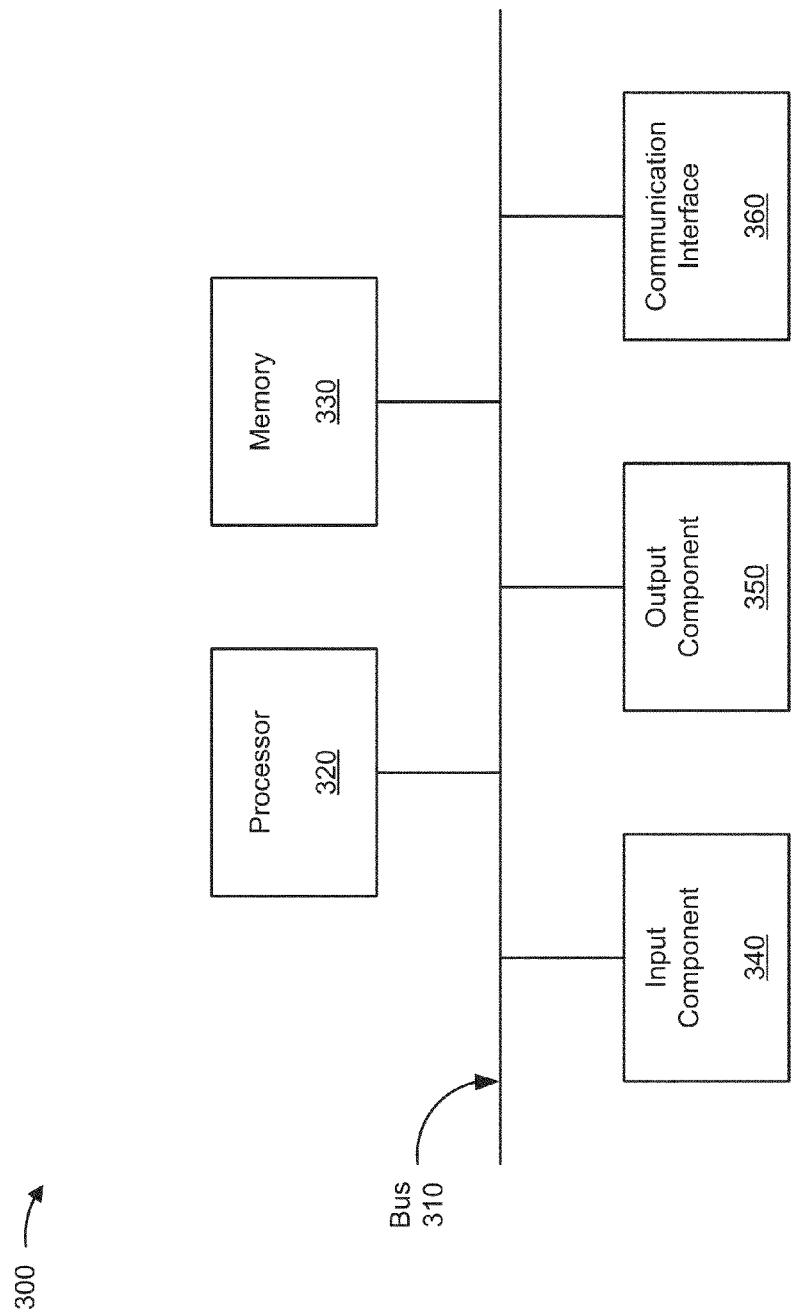
FIG. 3 is a diagram of example components of one or more devices of FIG. 2.

FIG. 3 is a diagram of example components of a device 300. Device 300 may correspond to user device 205, base station 215, MME 220, network tap 230, SGW 225, PGW 235, traffic identification device 245, and/or traffic configuration device 250. Additionally, or alternatively, each of user device 205, base station 215, MME 220, network tap 230, SGW 225, PGW 235, traffic identification device 245, and/or traffic configuration device 250 may include one or more devices 300 and/or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit), a microprocessor, and/or any processing component (e.g., a field-programmable gate array ("FPGA"), an application-specific integrated circuit ("ASIC"), etc.) that interprets and/or executes instructions. Memory 330 may include a random access memory ("RAM"), a read only memory ("ROM"), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes ("LEDs"), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency ("RF") interface, a universal serial bus ("USB") interface, a Wi-Fi interface, a cellular network interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3.

FIG. 4 is a flow chart of an example process 400 for dynamic network traffic analysis. In some implementations, one or more process blocks of FIG. 4 may be performed by traffic identification device 245. Additionally, or alternatively, one or more process blocks of FIG. 4 may be performed by another device or a group of devices separate from or including traffic identification device 245, such user device 205, base station 215, MME 220, network tap 230, SGW 225, PGW 235, and/or traffic configuration device 250.

As shown in FIG. 4, process 400 may include receiving an indication that a network congestion level associated with a base station satisfies a threshold (block 410). For example, traffic identification device 245 may receive an indication that a network congestion level associated with base station 215 satisfies the threshold. In some implementations, the network congestion level may be based on a measurable network resource, such as a physical resource block utilization, a packet latency, a packet jitter, a packet loss rate, an average packet delay, a packet queue length, a cell throughput, or the like. For example, the network congestion level associated with base station 215 may include the packet latency and packet jitter for a particular connection.

Base station 215 may determine that the network congestion level satisfies a threshold, in some implementations. For example, base station 215 may determine that a network congestion level associated with local network 210 satisfies the threshold, and may transmit information identifying the network congestion level to traffic identification device 245. In some implementations, base station 215 may determine the network congestion level based on information associated with the location of user device 205 and information identifying the quantity of data being requested by user device 205. Additionally, or alternatively, traffic identification device 245 may determine that the network congestion level associated with local network 210 satisfies a threshold. For example, traffic identification device 245 may determine, based on information identifying the network congestion level, received from base station 215, that the network congestion level exceeds a threshold.

Traffic identification device 245 may determine that the network congestion level satisfies the threshold based on a rate of increase of the network congestion level, in some implementations. For example, traffic identification device 245 may determine that the rate of increase of the network congestion level satisfies a rate threshold. The rate threshold may correspond to a rate at which the network congestion level is approaching the threshold network congestion level. In this case, traffic identification device 245 may consider the network congestion level as having exceeded the threshold, based on the network congestion level increasing faster than the rate threshold.

As further shown in FIG. 4, process 400 may include determining traffic flow information for traffic flows associated with the base station (block 420). For example, traffic identification device 245 may determine traffic flow information for traffic flows associated with base station 215 (e.g., connections of local network 210). A traffic flow, as used herein, may refer to a coordinated sequence of packets (e.g., a subdivision of traffic traveling via local network 210), such as traffic on a specific channel (e.g., a bearer channel, a transmission control protocol ("TCP") channel, etc.), a host-to-host communication path, a socket-to-socket communication, a bit stream, or the like, transmitted via local network 210 and associated with user device 205. In some implementations, traffic flow information may include information identifying traffic flows (e.g., a network address, such as an IP address, a virtual IP ("VIP") address, a subnetwork address, etc.), a QoS parameter associated with the traffic flows, a QoS class identifier ("QCI") parameter associated with the QoS parameter, a throughput rate associated with the traffic flows, or the like.

Traffic flow information may be determined based on capturing packets via one or more network taps 230, in some implementations. For example, network tap 230 may capture packet information, such as a timestamp, a source address identifier (e.g., an IP source address), a destination address identifier (e.g., an IP destination address), a port identifier (e.g., an IP port), a packet identifier, a traffic flow identifier, a service identifier (e.g., a differentiated services code point ("DSCP") identifier), or the like, and may determine traffic flow information based on the captured packet information.

Packet information may be captured from a connection between multiple network devices, in some implementations. A network device may include a device on local network 210, such as base station 215, MME 220, SGW 225, PGW 235, or the like. For example, network tap 230 may capture packet information from an S1-MME interface connection between base station 215 and MME 220. Additionally, or alternatively, network tap 230 may capture packet information from an S11 interface connection between MME 220 and SGW 225. Additionally, or alternatively, network tap 230 may capture packet information from an S1-U interface connection between SGW 225 and base station 215.

Network tap 230 may transmit captured packet information to traffic identification device 245, in some implementations. For example, network taps 230 may transmit captured packet information to traffic identification device 245, and traffic identification device 245 may process the captured packet information to determine traffic flow information.

As further shown in FIG. 4, process 400 may include identifying a congestion-causing traffic flow based on the traffic flow information (block 430). For example, traffic identification device 245 may identify a congestion-causing traffic flow based on the traffic flow information determined from the packet information captured by network taps 230. In some implementations, traffic identification device 245 may identify a congestion-causing traffic flow based on determining a traffic profile. For example, traffic identification device 245 may determine a traffic profile for user devices 205 associated with base station 215. The traffic profile may include information identifying a type of traffic (e.g., video traffic, HTTP traffic, LTE traffic, etc.), a parameter associated with the traffic (e.g., a video quality, a video transrate, etc.), or the like.

Traffic identification device 245 may identify the congestion-causing traffic flow from traffic flows capable of being configured to reduce traffic based on the traffic profile, in some implementations. For example, traffic identification device 245 may determine that a traffic flow corresponds to checking email messages or browsing the internet. In this case, traffic identification device 245 may determine that the traffic flow is not capable of being configured to reduce traffic and may determine the traffic flow to not be a congestion-causing traffic flow. Alternatively, traffic identification device 245 may determine that a traffic flow corresponds to streaming video of a particular transmission rate. In this case, traffic identification device 245 may determine that the streaming video transmission rate may be downgraded, resulting in traffic flow reduction, and may determine the traffic flow associated with the streaming video to be a congestion-causing traffic flow.

Traffic identification device 245 may identify the congestion-causing traffic flow, based on a traffic flow prioritization, in some implementations. For example, traffic identification device 245 may determine a prioritization score associated with a traffic flow (e.g., based on the traffic flow information, the traffic flow profile, a user subscription prioritization, etc.). In this case, traffic identification device 245 may determine the congestion-causing traffic flow to be a traffic flow associated with a prioritization score that satisfies a threshold.

As further shown in FIG. 4, process 400 may include providing information identifying the congestion-causing traffic flow (block 440). For example, traffic identification device 245 may provide information identifying the congestion-causing traffic flow to traffic configuration device 250. In some implementations, traffic identification device 245 may provide information identifying the congestion-causing traffic flow (e.g., a traffic flow identifier, traffic flow information, network congestion information, captured packet information, etc.) for processing, for storage, for generating reports, for display, or the like.

Although FIG. 4 shows example blocks of process 400, in some implementations, process 400 may include additional blocks, different blocks, fewer blocks, or differently arranged blocks than those depicted in FIG. 4. Further, one or more of the blocks of process 400 may be omitted in some implementations. Additionally, or alternatively, one or more of the blocks of process 400 may be performed in parallel.

Figure 5A:
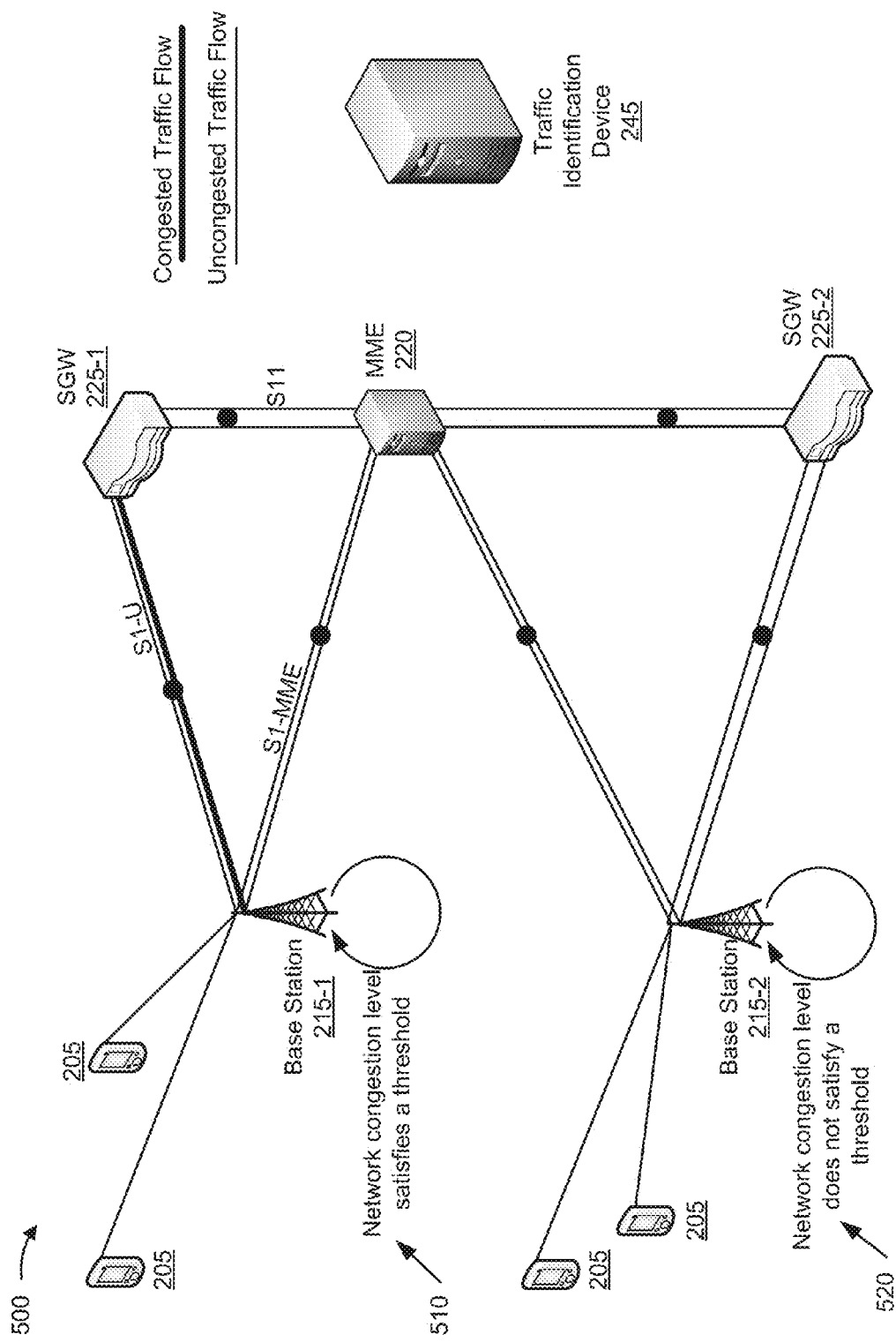
FIGS. 5A-5D are diagrams of an example implementation relating to the example process shown in FIG. 4.

FIGS. 5A-5D are diagrams of an example implementation 500 relating to process 400 shown in FIG. 4. As shown in FIG. 5A, example implementation 500 may include a first local network 210 (not shown), which includes base station 215-1, SGW 225-1, MME 220, and one or more user devices 205; a second local network 210 (not shown), which includes base station 215-2, SGW 225-2, MME 220, and one or more user devices 205; and traffic identification device 245. As shown by reference number 510, base station 215-1 determines that a network congestion level, associated with base station 215-1 (e.g., first local network 210), satisfies a threshold (e.g., is greater than, or equal to, a threshold). As shown by reference number 520, base station 215-2 determines that a network congestion level, associated with base station 215-2 (e.g., second local network 210), does not satisfy a threshold (e.g., is less than a threshold). The thresholds may be the same or different thresholds for different local networks 210.

Figure 5B:
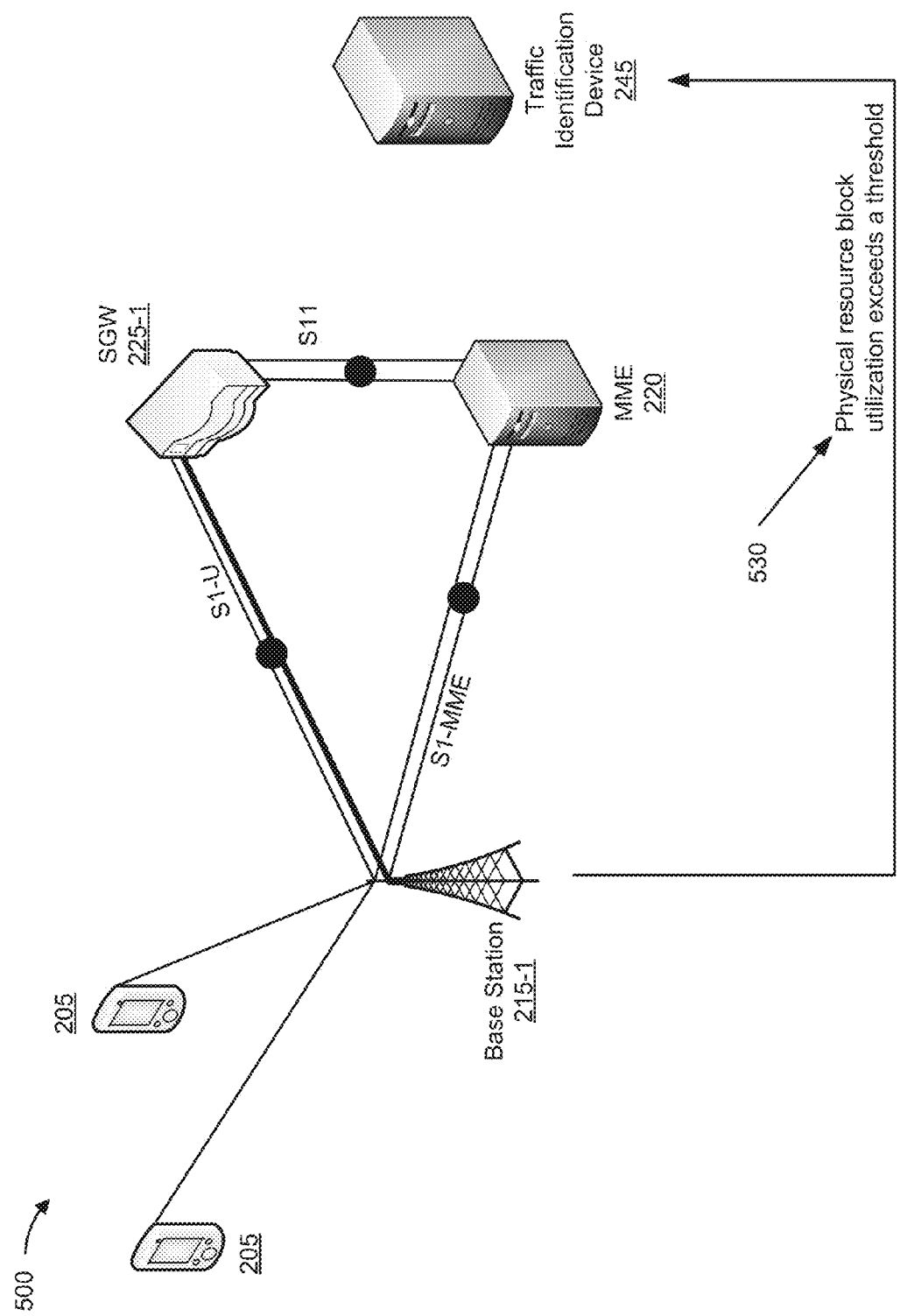

As shown in FIG. 5B, base station 215-1 transmits information associated with the network congestion level to traffic identification device 245. As shown by reference number 530, the information associated with the network congestion level is received by traffic identification device 245, and identifies a physical resource block ("PRB") utilization of base station 215-1 as exceeding the threshold.

Figure 5C:
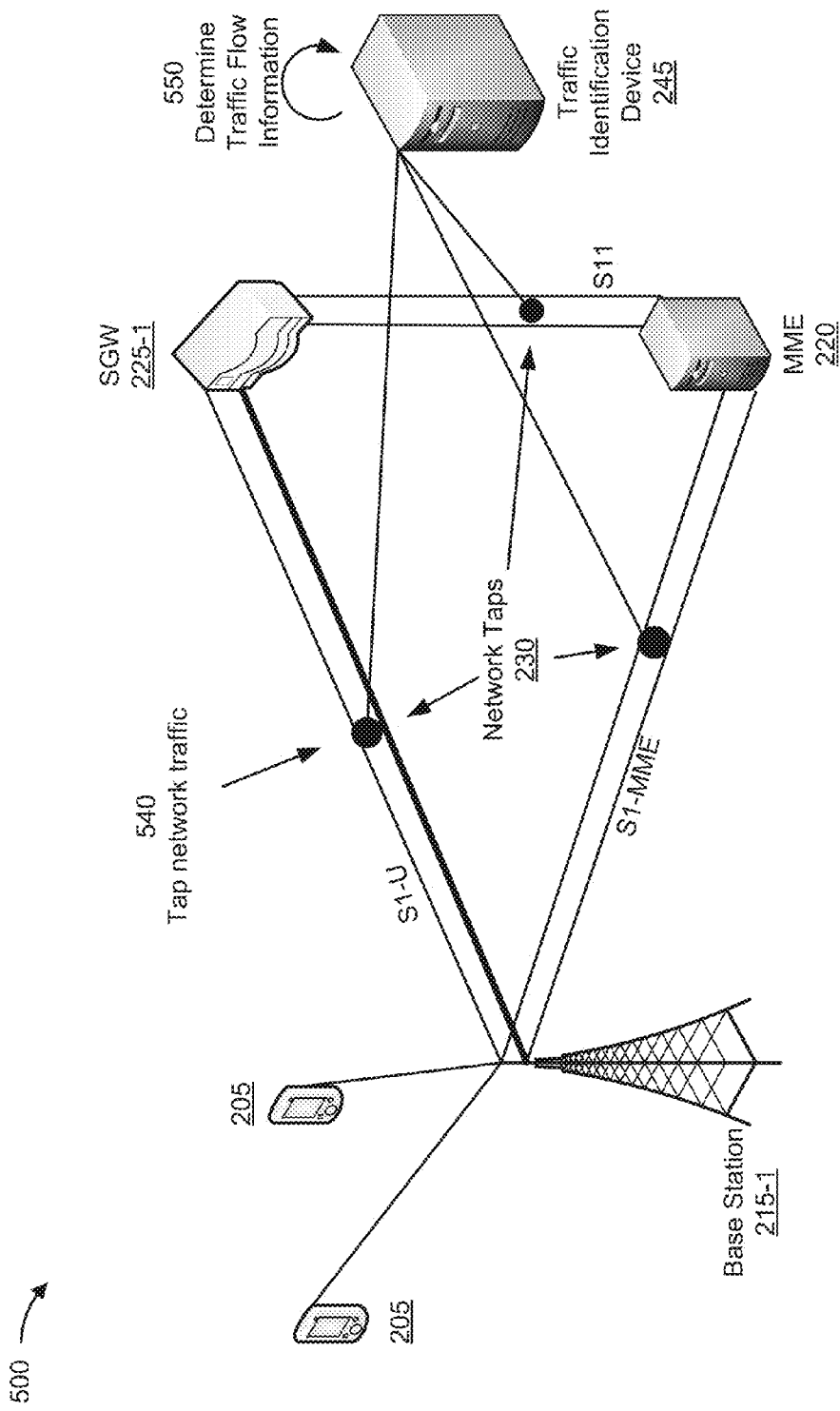

As shown in FIG. 5C, traffic identification device 245 captures packet information from network taps 230. As shown by reference number 540, network taps 230 are set up to capture packet information transmitted via the traffic flows associated with, for example, an S1-U interface connection between base station 215-1 and SGW 225-1, an S11 interface connection between SGW 225-1 and MME 220, and an S1-MME interface connection between MME 220 and base station 215-1. The captured packet information is relayed from network taps 230 to traffic identification device 245 and, as shown by reference number 550, traffic identification device 245 determines traffic flow information from the captured packet information.

Figure 5D:
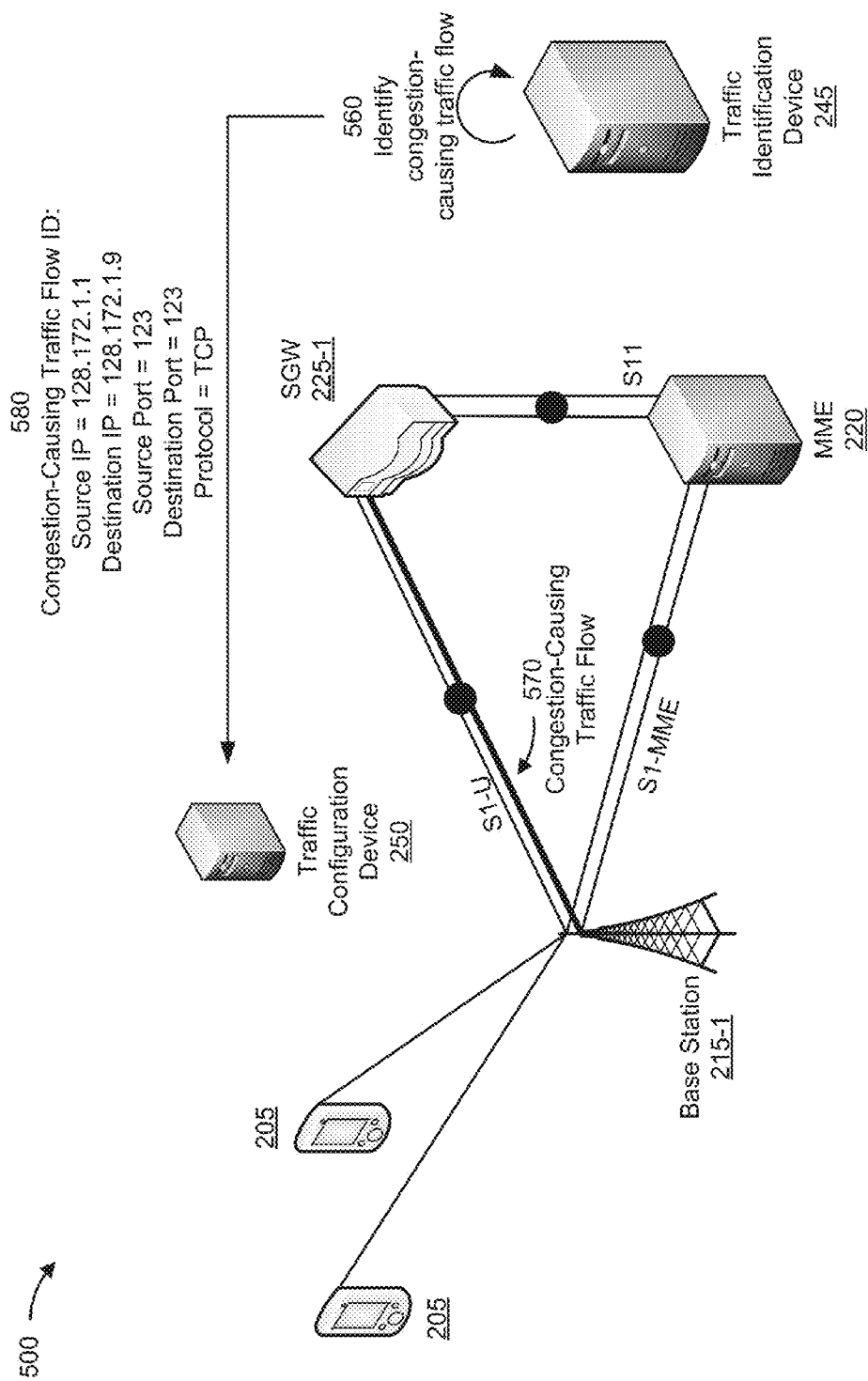

As shown in FIG. 5D, and by reference number 560, traffic identification device 245 identifies a congestion-causing traffic flow. As shown by reference number 570, assume that the congestion-causing traffic flow is identified as one of the traffic flows transmitted via the S1-U interface connection between base station 215-1 and SGW 225-1. As shown by reference number 580, traffic identification device 245 provides information identifying the congestion-causing traffic flow to traffic configuration device 250. The congestion-causing traffic flow identification information includes a source IP address (e.g., "128.172.1.1"), a destination IP address (e.g., "128.172.1.9"), a source port identifier (e.g., "123"), a destination port identifier (e.g., "123"), and a protocol (e.g., TCP), for the congestion-causing traffic flow. The congestion-causing traffic flow identification information may be used by traffic configuration device 250 in determining configuration parameters for alleviating network congestion.

As indicated above, FIGS. 5A-5D are provided merely as an example. Other examples are possible and may differ from what was described with regard to FIGS. 5A-5D.

Figure 6:
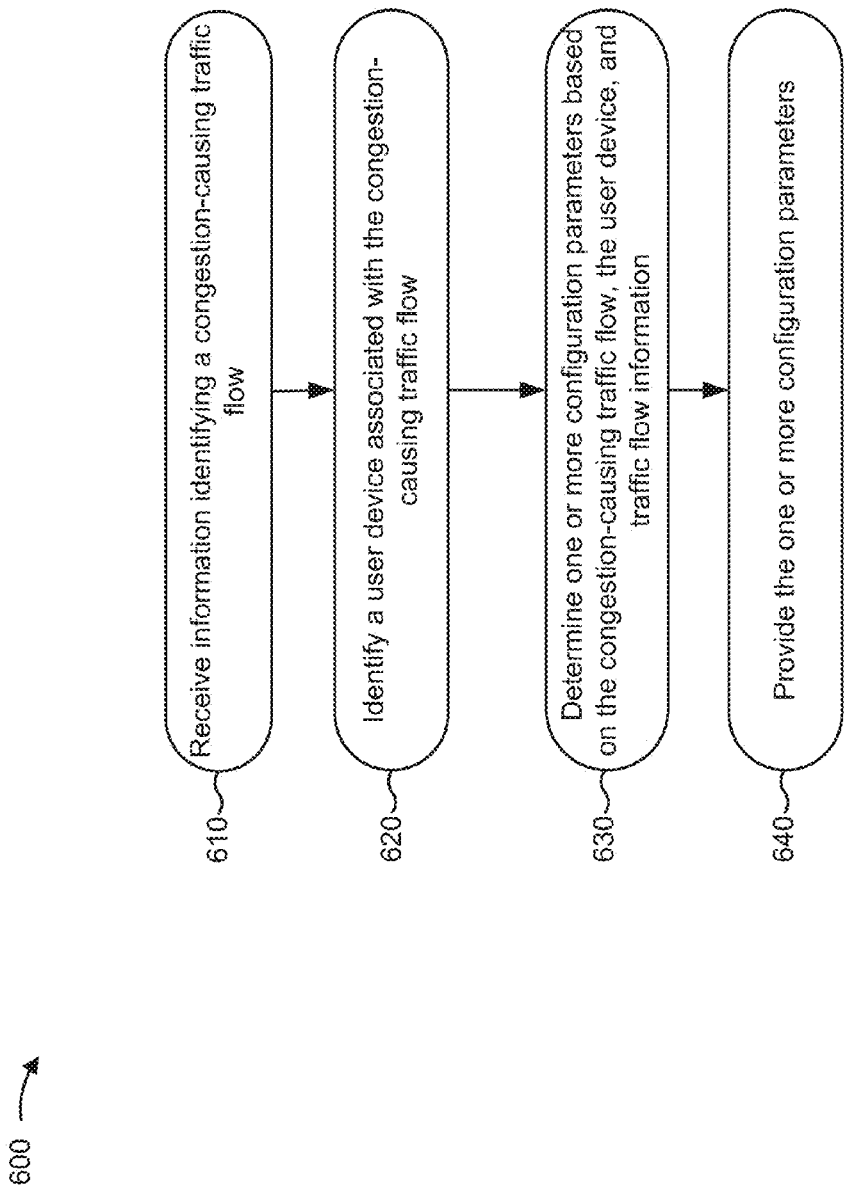
FIG. 6 is a flow chart of an example process for configuring a network based on dynamic network traffic analysis.

FIG. 6 is a flow chart of an example process 600 for configuring a network based on dynamic network traffic analysis. In some implementations, one or more process blocks of FIG. 6 may be performed by traffic configuration device 250. Additionally, or alternatively, one or more process blocks of FIG. 6 may be performed by another device or a group of devices separate from or including traffic configuration device 250, such as user device 205, base station 215, MME 220, network tap 230, SGW 225, PGW 235, and/or traffic identification device 245.

As shown in FIG. 6, process 600 may include receiving information identifying a congestion-causing traffic flow (block 610). For example, traffic configuration device 250 may receive information identifying the congestion-causing traffic flow from traffic identification device 245, such as a channel identification, a source address, a destination address, a traffic flow identifier, or the like.

As further shown in FIG. 6, process 600 may include identifying a user device associated with the congestion-causing traffic flow (block 620). For example, traffic configuration device 250 may receive information identifying a particular user device 205 as the user device associated with the congestion-causing traffic flow. In some implementations, traffic configuration device 250 may request and/or receive information identifying user device 205 from MME 220. For example, MME 220 may identify (e.g., by providing a phone identifier, a mobile device identifier, a universal resource indicator ("URI"), a universal resource locator ("URL"), an international mobile subscriber identity ("IMSI"), etc.) user device 205 as the user device associated with the congestion-causing flow. In some implementations, user device 205 may be identified based on information associated with the congestion-causing traffic flow. For example, a TCP channel associated with the congestion-causing traffic flow may be determined, and traffic configuration device 250 may determine the particular user device 205 associated with the TCP channel based on a database query (e.g., of a home subscriber server).

Traffic configuration device 250 may determine other information associated with user device 205, in some implementations. For example, traffic configuration device 250 may determine, based on the identity information of user device 205, information associated with a subscription of user device 205, such as a subscriber class, a priority class, or the like. In this case, traffic configuration device 250 may query a home subscriber server (e.g., via MME 220), and may receive information associated with the subscription of user device 205. In some implementations, traffic configuration device 250 may determine a geographic location associated with user device 205. For example, traffic configuration device 250 may determine a geographic location associated with user device 205 based on information provided by MME 220. In this case, a distance between user device 205 and base station 215 may be determined based on the geographic location, and may be used to determine one or more configuration parameters. In some implementations, traffic configuration device 250 may determine a signal strength associated with user device 205.

As further shown in FIG. 6, process 600 may include determining one or more configuration parameters based on the congestion-causing traffic flow, the user device, and traffic flow information (block 630). For example, traffic configuration device 250 may determine one or more configuration parameters based on information associated with the congestion-causing traffic flow, information associated with the user device, and the traffic flow information.

A configuration parameter may include an adjustment to a QoS algorithm, a buffer size, a queue length, a bandwidth, a traffic encoding algorithm, a scheduling algorithm, or the like. Additionally, or alternatively, a configuration parameter may include an adjustment to a configuration of a network device or a component of a network device, in some implementations. For example, traffic configuration device 250 may determine an adjustment to a network device, such as base station 215, MME 220, SGW 225, PGW 235, or the like. Additionally, or alternatively, a configuration parameter may include an adjustment to a traffic configuration. For example, traffic configuration device 250 may determine an adjustment to an encoding of network traffic traveling to and/or from service provider network 240 and/or user device 205, such as a TCP adjustment, a video transrate adjustment, a video transcode adjustment, or the like.

As further shown in FIG. 6, process 600 may include providing the one or more configuration parameters (block 640). For example, traffic configuration device 250 may provide a configuration parameter to a network device, such as base station 215, when the configuration parameter is associated with an adjustment to the network device. Additionally, or alternatively, traffic configuration device 250 may provide a configuration parameter to a device associated with service provider network 240, such as a packet processing device, an optimization engine, or the like, when the configuration parameter is associated with an adjustment to the encoding of the traffic. For example, when the configuration adjustment includes modifying the QoS policy associated with a traffic flow, traffic configuration device 250 may provide the configuration parameter to a policy and charging rule function ("PCRF"). Additionally, or alternatively, when the configuration adjustment includes modifying the video transport configuration, traffic configuration device 250 may provide the configuration parameter to a device enforcing the video transporting rate (e.g., a device associated with service provider network 240, SGW 225, PGW 235, etc.).

Although FIG. 6 shows example blocks of process 600, in some implementations, process 600 may include additional blocks, different blocks, fewer blocks, or differently arranged blocks than those depicted in FIG. 6. Further, one or more of the blocks of process 600 may be omitted in some implementations. Additionally, or alternatively, one or more of the blocks of process 600 may be performed in parallel.

Figure 7A:
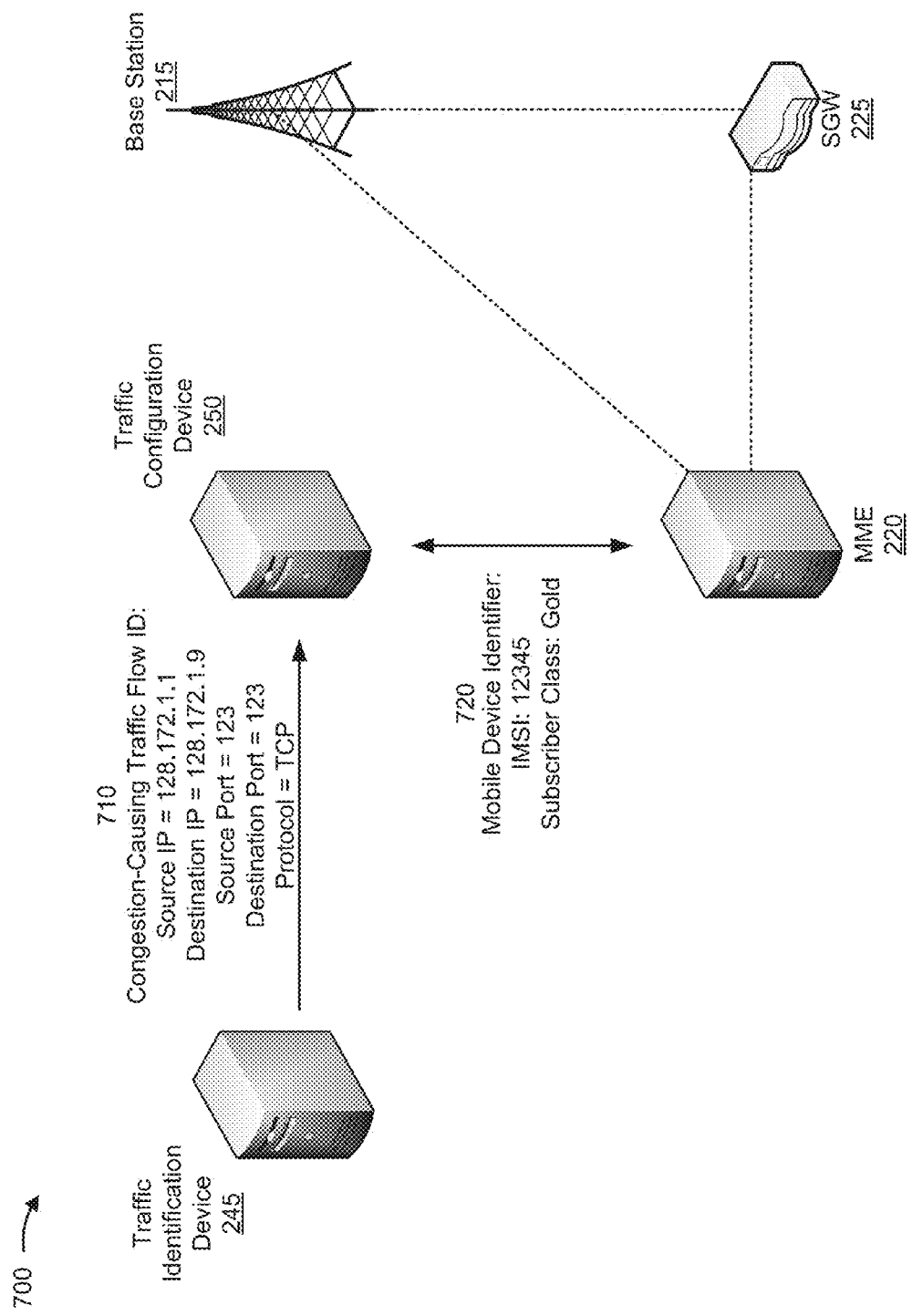
FIGS. 7A and 7B are diagrams of an example implementation relating to the example process shown in FIG. 6.
Figure 7B:
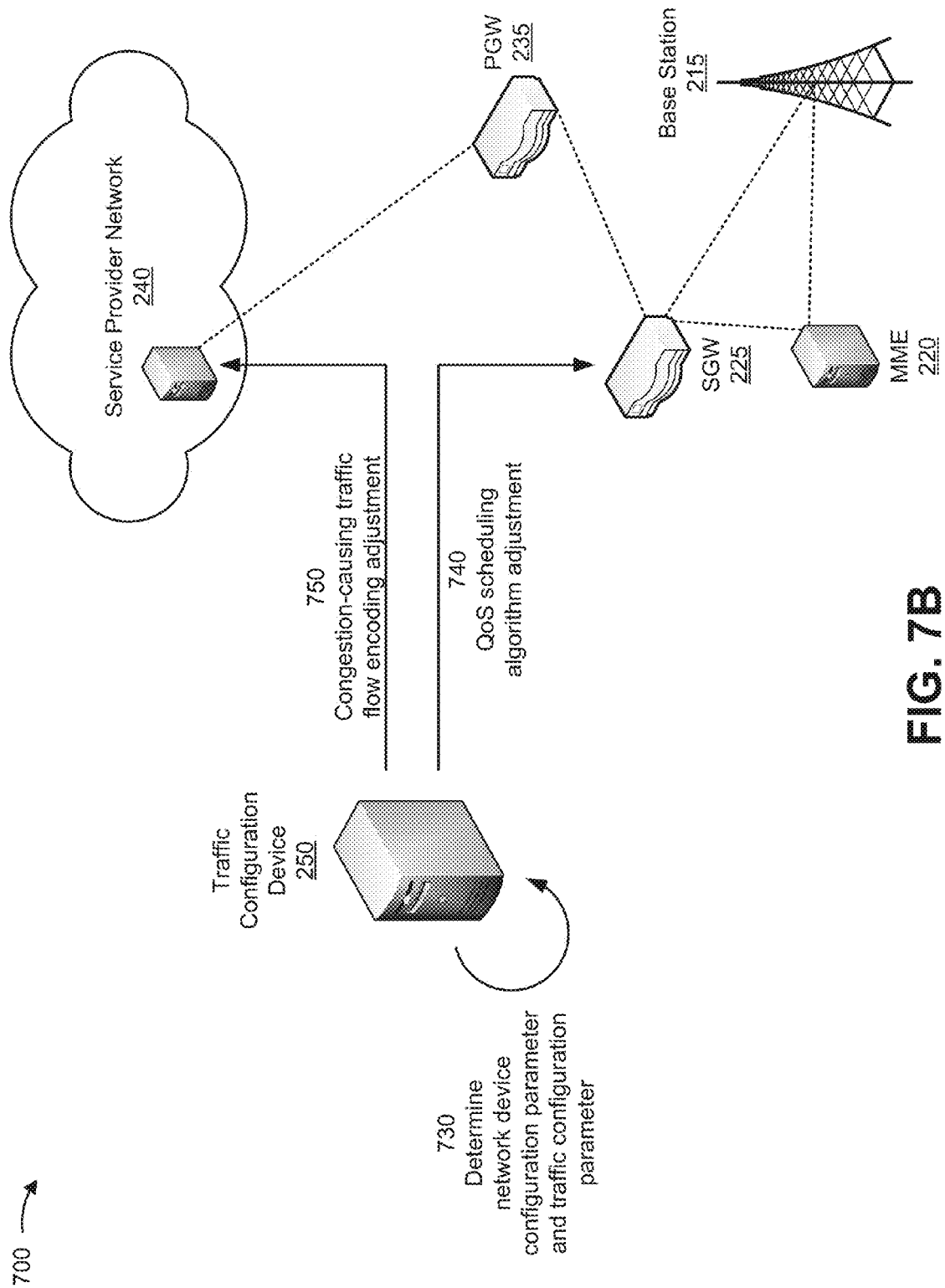

FIGS. 7A and 7B are diagrams of an example implementation 700 relating to process 600 shown in FIG. 6. As shown in FIG. 7A, example implementation 700 may include base station 215, MME 220, SGW 225, traffic identification device 245, and traffic configuration device 250. Assume that traffic identification device 245 has identified a congestion-causing traffic flow by a source IP address (e.g., "128.172.1.1"), a destination IP address (e.g., "128.172.1.9"), a source port identifier (e.g., "123"), a destination port identifier (e.g., "123"), and a protocol (e.g., TCP), as described herein in connection with FIG. 4. As shown by reference number 710, traffic identification device 245 provides information identifying the congestion-causing traffic flow (e.g., the source IP address and the destination IP address) to traffic configuration device 250.

As shown by reference number 720, traffic configuration device 250 requests and receives information identifying the user device associated with the congestion-causing traffic flow (e.g., a mobile device identifier) from MME 220. The mobile device identifier includes an IMSI (e.g., "12345") associated with the user device (e.g., user device 205) and an identifier of the subscription class associated with the user device (e.g., "Gold").

As shown in FIG. 7B, and by reference number 730, traffic configuration device 250 determines multiple configuration parameters to alleviate congestion on the network associated with base station 215 (e.g., local network 210). Traffic configuration device 250 determines the multiple configuration parameters based on the congestion-causing traffic flow (e.g., traffic flow information associated therewith, a congestion-causing traffic flow identifier, etc.) and the user device (e.g., a location, the subscription class, etc.), or the like. Assume that traffic configuration device 250 determines a network device configuration parameter associated with an adjustment to SGW 225 and a traffic configuration parameter associated with an adjustment to the data encoding of traffic being transmitted from service provider network 240.

As shown by reference number 740, traffic configuration device 250 sends the network device configuration parameter (e.g., a QoS scheduling algorithm adjustment) to SGW 225. SGW 225 may adjust the QoS scheduling algorithm based on the network device configuration parameter to alleviate congestion on local network 210. As shown by reference number 750, traffic configuration device 250 sends the traffic configuration parameter (e.g., an adjustment to the congestion-causing traffic flow encoding) to a device associated with service provider network 240 (e.g., a transcoding device). The device associated with service provider network 240 may adjust the data encoding associated with the congestion-causing traffic flow based on the traffic configuration parameter to alleviate congestion on local network 210.

As indicated above, FIGS. 7A and 7B are provided merely as an example. Other examples are possible and may differ from what was described with regard to FIGS. 7A and 7B.

Implementations described herein may allow a traffic identification device to dynamically determine a congestion-causing traffic flow for a congested network thereby facilitating alleviation of congestion by reconfiguring a network parameter.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in conjunction with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A system, comprising:
one or more devices to:

receive, from a base station, information indicating that a network congestion level associated with the base station satisfies a threshold,
the network congestion level being a measurement of traffic associated with a network,
the network including the base station;
determine, based on receiving the information indicating that the network congestion level satisfies the threshold and by using network taps, traffic flow information for a plurality of traffic flows associated with the base station,
the network taps being located between the base station and network devices, and
the network taps being separate from the base station, the network devices, and the one or more devices;
determine, based on the traffic flow information, one or more traffic flows, of the plurality of traffic flows, that are capable of being configured to reduce the network congestion level;
identify a congestion-causing traffic flow, of the one or more traffic flows, based on determining the one or more traffic flows that are capable of being configured to reduce the network congestion level; and
provide information identifying the congestion-causing traffic flow.

2. The system of claim 1, where the one or more devices are further to:
identify a user device associated with the congestion-causing traffic flow;
determine one or more configuration parameters based on the congestion-causing traffic flow, the user device, and the traffic flow information; and
provide the one or more configuration parameters,
the one or more configuration parameters causing an adjustment to a network device of the network devices, and
the adjustment to the network device causing a reduction in the network congestion level.

3. The system of claim 2, where the one or more devices, when providing the one or more configuration parameters, are to:
cause a change to a configuration, of a network device of the network devices, based on the one or more configuration parameters.

4. The system of claim 1,
where the one or more devices are further to:
receive user device information from the base station,
the user device information indicating a location of one or more user devices associated with the network and a quantity of data requested by the one or more user devices; and
where the one or more devices, when determining the traffic flow information, are to:
determine the traffic flow information based on the user device information.

5. The system of claim 1,
where the one or more devices are further to:
determine, based on the traffic flow information, a flow priority associated with the congestion-causing traffic flow; and
where the one or more devices, when identifying the congestion-causing traffic flow, are to:
identify the congestion-causing traffic flow based on the flow priority.

6. The system of claim 1, where, when determining the traffic flow information, the one or more devices are to:
capture packet information via a network tap of the network taps,
the packet information being associated with packets associated with the plurality of traffic flows and traveling over a segment of the network, and
determine the traffic flow information based on the packet information.

7. A non-transitory computer-readable medium storing instructions, the instructions comprising:
one or more instructions that, when executed by one or more processors, cause the one or more processors to:
receive, from a base station, information identifying a network congestion level associated with a network;
determine, based on receiving the information identifying the network congestion level from the base station and by using network taps, traffic flow information for a plurality of traffic flows associated with the base station,
the network taps being located between the base station and network devices, and
the network taps being separate from the base station and the network devices;
determine, based on the traffic flow information, one or more traffic flows, of the plurality of traffic flows, that are capable of being configured to reduce the network congestion level;
identify a congestion-causing traffic flow, of the one or more traffic flows that are capable of being configured to reduce the network congestion level; and
provide information identifying the congestion-causing traffic flow.

8. The non-transitory computer-readable medium of claim 7, where the one or more instructions, when executed by the one or more processors, further cause the one or more processors to:
determine a configuration parameter based on identifying the congestion-causing traffic flow; and
cause an adjustment to the congestion-causing traffic flow based on the configuration parameter.

9. The non-transitory computer-readable medium of claim 8, where the adjustment to the congestion-causing traffic flow includes at least one of:
a video transcoding adjustment;
a video transmission rate adjustment;
a quality of service adjustment;
a traffic flow rate limit adjustment;
a traffic routing algorithm adjustment; or
a bandwidth adjustment.

10. The non-transitory computer-readable medium of claim 7,
where the one or more instructions, when executed by the one or more processors, further cause the one or more processors to:
identify a user device associated with the congestion-causing traffic flow; and
determine subscription class information associated with the user device; and
where the one or more instructions, that cause the one or more processors to identify the congestion-causing traffic flow, cause the one or more processors to:
identify the congestion-causing traffic flow based on the subscription class information.

11. The non-transitory computer-readable medium of claim 7,
where the one or more instructions, when executed by the one or more processors, further cause the one or more processors to:

identify a user device associated with the congestion-causing traffic flow; and
determine a geographic location associated with the user device; and
where the one or more instructions, that cause the one or more processors to identify the congestion-causing traffic flow, cause the one or more processors to:
identify the congestion-causing traffic flow based on the geographic location associated with the user device.

12. The non-transitory computer-readable medium of claim 7,
where the one or more instructions, that cause the one or more processors to receive information identifying the network congestion level, cause the one or more processors to:
identify the base station based on receiving the information identifying the network congestion level from the base station; and
where the one or more instructions, when causing the one or more processors to determine the traffic flow information, cause the one or more processors to:
determine the traffic flow information based on identifying the base station.

13. The non-transitory computer-readable medium of claim 7, where the one or more instructions, when causing the one or more processors to determine the traffic flow information, cause the one or more processors to:
capture packet information via a network tap of the network taps,
the packet information being associated with packets associated with the plurality of traffic flows and traveling over a network segment, and
determine the traffic flow information based on the packet information.

14. A method, comprising:
receiving, by one or more devices and from one or more base stations, information identifying one or more network congestion levels associated with one or more networks,
the one or more networks including the one or more base stations, and
the one or more network congestion levels including a network congestion level associated with a base station of the one or more base stations;
determining, by the one or more devices and based on receiving the information identifying the one or more network congestion levels, traffic flow information for a plurality of traffic flows associated with the base station, by using network taps,
the network taps being located between the base station and network devices or between the network devices, and
the network taps being separate from the base station and the network devices;
determining, by the one or more devices and based on the traffic flow information, one or more traffic flows, of the plurality of traffic flows, that are capable of being configured to reduce the network congestion level;
identifying, by the one or more devices, a congestion-causing traffic flow, of the one or more traffic flows, based on determining the one or more traffic flows capable of being configured to reduce the network congestion level; and
providing, by the one or more devices, information identifying the congestion-causing traffic flow.

15. The method of claim 14, further comprising:
determining a user device associated with the congestion-causing traffic flow;
determining a configuration parameter based on the congestion-causing traffic flow, the user device, and the traffic flow information; and
providing the configuration parameter,
the configuration parameter causing an adjustment to the congestion-causing traffic flow.

16. The method of claim 14, further comprising:
determining that the congestion-causing traffic flow is associated with transmission of video traffic;
determining a first transmission rate associated with the video traffic;
determining a second transmission rate based on the traffic flow information,
the second transmission rate being less than the first transmission rate; and
causing the video traffic to be transmitted at the second transmission rate.

17. The method of claim 14, further comprising:
determining a plurality of user devices associated with the base station;
determining a plurality of geographic locations associated with the plurality of user devices;
determining a quantity of data requested by the plurality of user devices; and
determining, before determining the traffic flow information, that the network congestion level satisfies a threshold based on the plurality of geographic locations and the quantity of data requested by the plurality of user devices.

18. The method of claim 14, further comprising:
determining a rate of increase of the network congestion level;
determining that the rate of increase of the network congestion level satisfies a first threshold; and
determining, before determining the traffic flow information, that the network congestion level satisfies a second threshold based on determining that the rate of increase of the network congestion level satisfies the first threshold.

19. The method of claim 14, further comprising:
determining an ordering of the one or more traffic flows based on determining the one or more traffic flows capable of being configured,
where identifying the congestion-causing traffic flow comprises:
identifying the congestion-causing traffic flow based on the ordering of the one or more traffic flows.

20. The system of claim 1, where the plurality of traffic flows include:
the one or more traffic flows capable of being configured to reduce the network congestion level, and
a traffic flow that is not capable of being configured to reduce the network congestion level.

* * * * *